(12) United States Patent
Perbandt

(10) Patent No.: US 10,987,627 B2
(45) Date of Patent: Apr. 27, 2021

(54) REDUCING THE EMISSION OF NITROGEN OXIDE WHEN STARTING UP SYSTEMS FOR PRODUCING NITRIC ACID

(71) Applicants: ThyssenKrupp Industrial Solutions AG, Essen (DE); ThyssenKrupp AG, Essen (DE)

(72) Inventor: Christian Perbandt, Dortmund (DE)

(73) Assignees: thyssenkrupp Industrial Solutions AG, Essen (DE); thyssenkrupp AG, Essen (DE)

(*) Notice: Subject to any disclaimer, the term of this patent is extended or adjusted under 35 U.S.C. 154(b) by 0 days.

(21) Appl. No.: 15/315,344

(22) PCT Filed: Jun. 1, 2015

(86) PCT No.: PCT/EP2015/062154
§ 371 (c)(1),
(2) Date: Nov. 30, 2016

(87) PCT Pub. No.: WO2015/185506
PCT Pub. Date: Dec. 10, 2015

(65) Prior Publication Data
US 2017/0197178 A1 Jul. 13, 2017

(30) Foreign Application Priority Data

Jun. 4, 2014 (DE) .................... 10 2014 210 661.3

(51) Int. Cl.
| | | |
|---|---|---|
| B01D 53/86 | (2006.01) |
| B01D 53/94 | (2006.01) |
| B01D 53/90 | (2006.01) |
| C01B 21/02 | (2006.01) |
| B01J 29/072 | (2006.01) |

(52) U.S. Cl.
CPC ..... *B01D 53/8696* (2013.01); *B01D 53/8628* (2013.01); *B01D 53/8631* (2013.01); *B01D 53/90* (2013.01); *B01D 53/9495* (2013.01); *B01J 29/072* (2013.01); *C01B 21/02* (2013.01); *B01D 2251/206* (2013.01); *B01D 2251/2062* (2013.01); *B01D 2251/2067* (2013.01); *B01D 2255/1021* (2013.01); *B01D 2255/2092* (2013.01); *B01D 2255/20738* (2013.01); *B01D 2255/20746* (2013.01); *B01D 2255/20761* (2013.01); *B01D 2255/30* (2013.01); *B01D 2255/50* (2013.01); *B01D 2255/504* (2013.01); *B01D 2255/91* (2013.01); *B01D 2257/402* (2013.01); *B01D 2257/404* (2013.01); *B01D 2258/02* (2013.01); *Y02C 20/10* (2013.01); *Y02P 20/151* (2015.11)

(58) Field of Classification Search
None
See application file for complete search history.

(56) References Cited

U.S. PATENT DOCUMENTS

| | | | | |
|---|---|---|---|---|
| 4,869,890 A | * | 9/1989 | Adams | .................... C01B 21/26 423/392 |
| 6,890,501 B2 | | 5/2005 | Delahay et al. | |
| 8,833,062 B1 | * | 9/2014 | Andreasson | ....... B01D 53/9431 60/295 |
| 9,810,118 B2 | * | 11/2017 | Gandhi | ............. B01D 53/8631 |

(Continued)

FOREIGN PATENT DOCUMENTS

| | | |
|---|---|---|
| CN | 103161546 A | 6/2013 |
| DE | 10 2005 022 650 A1 | 11/2006 |

(Continued)

OTHER PUBLICATIONS

"Cleaner Nitric Acid Plant Tail Gas"; Nitrogen, British Sulphur Co., London, GB, No. 207, Jan. 1, 1994 (Jan. 1, 1994), pp. 33/34, 36-40, XP000423568, ISSN: 0029-0777, p. 34-p. 39; figure 1.
G. Ertl, Fl Knözinger J. Weitkamp: Handbook of Heterogeneous Catalysis, vol. 4, pp. 1633-1668, VCH Weinheim (1997).
Atlas of Zeolite Structure Types, Elsevier, 4th revised edition 1996.
"Reaction Pathways in the Selective Catalytic Reduction Process with NO and NO2 at low temperatures" Koebel et al, Ind. Eng. Chem. Res. 40 (2001) 52-59.
Iwaki et al, Appl. Catal. A, 390 (2010) 71-77.
Iwaki et al, Applied Catalysis A, 390 (2010) 71-77.
Int'l Search Report for PCT/EP2015/062154 dated Aug. 18, 2015 (mailed Sep. 28, 2015).
G. Ertl, H. Knözinger J. Weitkamp: Handbook of Heterogeneous Catalysis, vol. 4, pp. 1633-1668, VCH Weinheim (1997).
English Language Abstract for DE 10 2005 022 650 A1.

(Continued)

*Primary Examiner* — Sheng H Davis

(74) *Attorney, Agent, or Firm* — thyssenkrupp North America, LLC

(57) ABSTRACT

A method of reducing $NO_x$ in tail gas obtained during startup of a plant for preparing nitric acid may involve heating the tail gas from a starting temperature $T_0$, through a threshold temperature $T_G$, to an operating temperature $T_B$ at which steady-state operation of the plant can occur ($T_0 < T_G < T_B$). $NO_x$-containing tail gas may be passed through a storage medium and at least partially stored while the temperature of the tail gas is lower than the threshold temperature $T_G$. The $NO_x$ may be released, preferably when the temperature of the tail gas has attained the threshold temperature $T_G$. The $NO_x$ may be combined with a reducing agent in the presence of an SCR catalyst after the temperature of the tail gas has exceeded the threshold temperature $T_G$, but not before, resulting in catalytic reduction of at least a portion of the $NO_x$.

11 Claims, 4 Drawing Sheets

(56) References Cited

U.S. PATENT DOCUMENTS

| | | | |
|---|---|---|---|
| 2002/0028170 A1* | 3/2002 | Sudduth | B01D 53/8625 423/235 |
| 2002/0127163 A1* | 9/2002 | Chen | B01D 53/8625 423/239.2 |
| 2004/0115111 A1* | 6/2004 | Twigg | B01D 53/9418 423/239.1 |
| 2006/0051277 A1 | 3/2006 | Schwefer et al. | |
| 2006/0260296 A1* | 11/2006 | Theis | F01N 3/0807 60/286 |
| 2010/0313548 A1* | 12/2010 | Theis | F01N 3/208 60/276 |
| 2013/0152553 A1* | 6/2013 | Gonze | F01N 3/2013 60/286 |
| 2015/0047325 A1* | 2/2015 | Simon | F01N 3/2006 60/274 |

FOREIGN PATENT DOCUMENTS

| | | |
|---|---|---|
| DE | 102012010017 A1 | 11/2013 |
| EP | 1259307 A1 | 11/2002 |
| EP | 1 268 040 A1 | 1/2003 |
| EP | 1 370 342 B1 | 12/2003 |
| EP | 1497014 A1 | 1/2005 |
| EP | 2172627 A1 | 4/2010 |
| EP | 1 515 791 B1 | 8/2011 |
| EP | 2286897 B1 | 7/2012 |
| JP | 52072366 * | 12/1975 |
| JP | 2013015027 A | 1/2013 |
| WO | 03078314 A1 | 9/2003 |
| WO | 03/105998 A1 | 12/2003 |

OTHER PUBLICATIONS

Iwaki et al, Appl. Catal. A, 390 (2010) 71-77 or Koebel et al, Ind. Eng. Chem. Res. 40 (2001) 52-59.

Wiesenberger, "State-Of-The-Art for the Production of Nitric Acid With Regard to the IPPC Directive", Federal Environment Agency—Austria, https://www.umweltbundesamt.at/fileadmin/site/publikationen/M150.pdf, (2001).

* cited by examiner

US 10,987,627 B2

REDUCING THE EMISSION OF NITROGEN OXIDE WHEN STARTING UP SYSTEMS FOR PRODUCING NITRIC ACID

CROSS REFERENCE TO RELATED APPLICATIONS

This application is a U.S. National Stage Entry of International Patent Application Serial Number PCT/EP2015/062154, filed Jun. 1, 2015, which claims priority to German Patent Application No. DE 10 2014 210 661.3 filed Jun. 4, 2014, the entire contents of both of which are incorporated herein by reference.

FIELD

The present disclosure generally relates to reducing emissions of nitrogen oxides that are produced during startup of plants for preparation of nitric acid.

BACKGROUND

Nitric acid is typically prepared by catalytically oxidizing $NH_3$ with atmospheric oxygen. The $NO_x$ formed is oxidized with oxygen to $NO_2$ and then absorbed with $H_2O$ in an absorption tower to form $HNO_3$. However, the tail gas leaving the absorption tower still contains various nitrogen oxides, mainly $NO_x$ and $NO_2$. These nitrogen oxides can be removed from the tail gas during the steady-state operation of the plants by established gas cleaning systems. These reduce $NO_x$ and $NO_2$, referred to collectively as $NO_x$, typically by SCR (Selective Catalytic Reduction) methods with supply of suitable reducing agents, for example ammonia, over suitable SCR catalysts, for example $V_2O_5/TiO_2$-based $DeNO_x$ catalysts. The relative proportion of $NO_2$ based on the total molar amount of $NO_x$ in the tail gas is characterized by the oxidation level of the $NO_x$. The $NO_x$ leaving the absorption tower during the steady-state operation of the plant typically has an oxidation level of about 40%. Oxidation levels of 30% to 70% are of good suitability for reducing the content of $NO_x$ with the aid of established gas cleaning systems over conventional SCR catalysts (for example based on $V_2O_5/TiO_2$), because reduction is then possible by what is called the "fast" SCR mechanism. A further development of SCR technology in the field of nitric acid technology is the EnviNOx® method, in which both $NO_x$ and $N_2O$ are reduced particularly effectively by supply of suitable reducing agents and $NO_x$ is virtually no longer detectable in many cases in the offgas. It is thus possible for the operators of plants for preparation of nitric acid, in the steady-state operation of the plants, to comply with limits for emissions of $NO_x$ and $N_2O$ that have been fixed by regulators.

By contrast with the steady-state operation of the plants for preparation of nitric acid, it is currently not possible during the startup of the plants to avoid time-limited emissions of nitrogen oxides which distinctly exceed the standard limits. A portion of the emissions are gases which have remained in the pipelines and apparatuses during the shutdown of the plant or have formed therein. A further portion results from outgassing of $NO_x$ from unbleached nitric acid (containing dissolved $NO_x$), which is typically applied to the absorption tower for filling in the course of restarting of the $HNO_3$ plant. Since the plants typically cool down during the shutdown, the $NO_x$ nitrogen oxides are present predominantly in the form of $NO_2$ because of the thermodynamic equilibrium at this temperature, which is increasingly visually perceptible from concentrations of about 20 ppm in the offgas from nitric acid plants. These $NO_2$-containing gases are then discharged as brown-colored offgas during the startup of the plant. These states of operation have not been given significant consideration to date because they occur comparatively rarely and public interest was relatively low. Because of the increasing environmental awareness of the population and the resulting emission laws, there is now an increasing need also to be able to start up the plants with reduced emissions or in a "colorless" manner.

In the case of startup from the shut-down, possibly completely or at least slightly cooled state, a plant for preparation of $HNO_3$ is typically filled with air with the aid of compressors which are operated with supply of outside energy, for example with power or steam, and brought to operating pressure ("pressurization"). This heats up the tail gas at the inlet of the gas cleaning system, but the temperature thus attained is not yet sufficient to be able to put the gas cleaning system into operation. This is because gas cleaning systems in which $NH_3$ is used as reducing agent for the $NO_x$ can only be put into permanent operation from a minimum threshold temperature, in order to avoid the unwanted formation and accumulation of $NH_4NO_3$ on the SCR catalyst. This threshold temperature is frequently in the range from 170 to 200° C. Because the temperature of the tail gas is still too low and also because of the unfavorable oxidation level of the $NO_x$, in conventional plants, therefore, the $NO_x$ obtained during the compression is not treated in a gas cleaning system but simply emitted, or is only treated in a gas cleaning system at a later juncture when the tail gas temperature has already distinctly exceeded the threshold of 170° C. to 200° C. After the compression of the $HNO_3$ plant with air, the absorption tower is then typically filled with nitric acid ("filling"). After the filling has ended, the oxidation of $NH_3$ is then started ("ignition"). After the ignition, the temperature of the tail gas rises constantly, according to the type of $HNO_3$ plant, up to the steady-state operating temperature of typically about 300° C. to about 600° C., and the gas cleaning system can be operated without unwanted formation and accumulation of $NH_4NO_3$. From this operation point, it is then also possible to comply with the legally stipulated $NO_x$ emission limits.

Attempts have also been made to achieve colorlessness of the emissions of $NO_x$ during the startup and shutdown of the plants by feeding in additional air (cf. WO 03078314A1). These measures can bring about colorlessness of the emissions, but without reducing the absolute amount thereof, since the offgas here is merely being diluted. In this case, the relatively large and time-limited $NO_x$ concentration peaks with an oxidation level greater than 70% during the compression and at the start of filling of the $HNO_3$ plant constitute a particular problem because the gas cleaning system cannot yet be operated owing to the excessively low temperature at this stage.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure concerns reducing emissions of nitrogen oxides obtained in the course of startup of plants for preparation of nitric acid.

A first aspect of the invention relates to a method of reducing the concentration of $NO_x$ nitrogen oxides (NO, $NO_2$) in tail gas obtained during the startup of a plant for preparation of nitric acid;

wherein the tail gas contains $NO_x$ and wherein the tail gas is obtained during the startup of the plant and is heated preferably as a result of the measures for preparation of nitric acid from a starting temperature $T_0$, passing through a threshold temperature $T_G$ and finally up to an operating temperature $T_B$ at which steady-state operation of the plant is subsequently effected ($T_0 < T_G < T_B$);

wherein the method comprises the following steps:
  (a) passing the $NO_x$-containing tail gas through a storage medium for $NO_x$ and storing at least a portion of the $NO_x$ in the storage medium for $NO_x$ while the temperature of the tail gas is lower than the threshold temperature $T_G$;
  (b) optionally releasing the $NO_x$ stored in step (a), preferably when the temperature of the tail gas has attained the threshold temperature $T_G$;
  (c) combining the $NO_x$ with a reducing agent for $NO_x$ in the presence of an SCR catalyst after the temperature of the tail gas has exceeded the threshold temperature $T_G$, but not before, which results in catalytic reduction of at least a portion of the $NO_x$, preferably to $N_2$ and $H_2O$.

Figure 1:
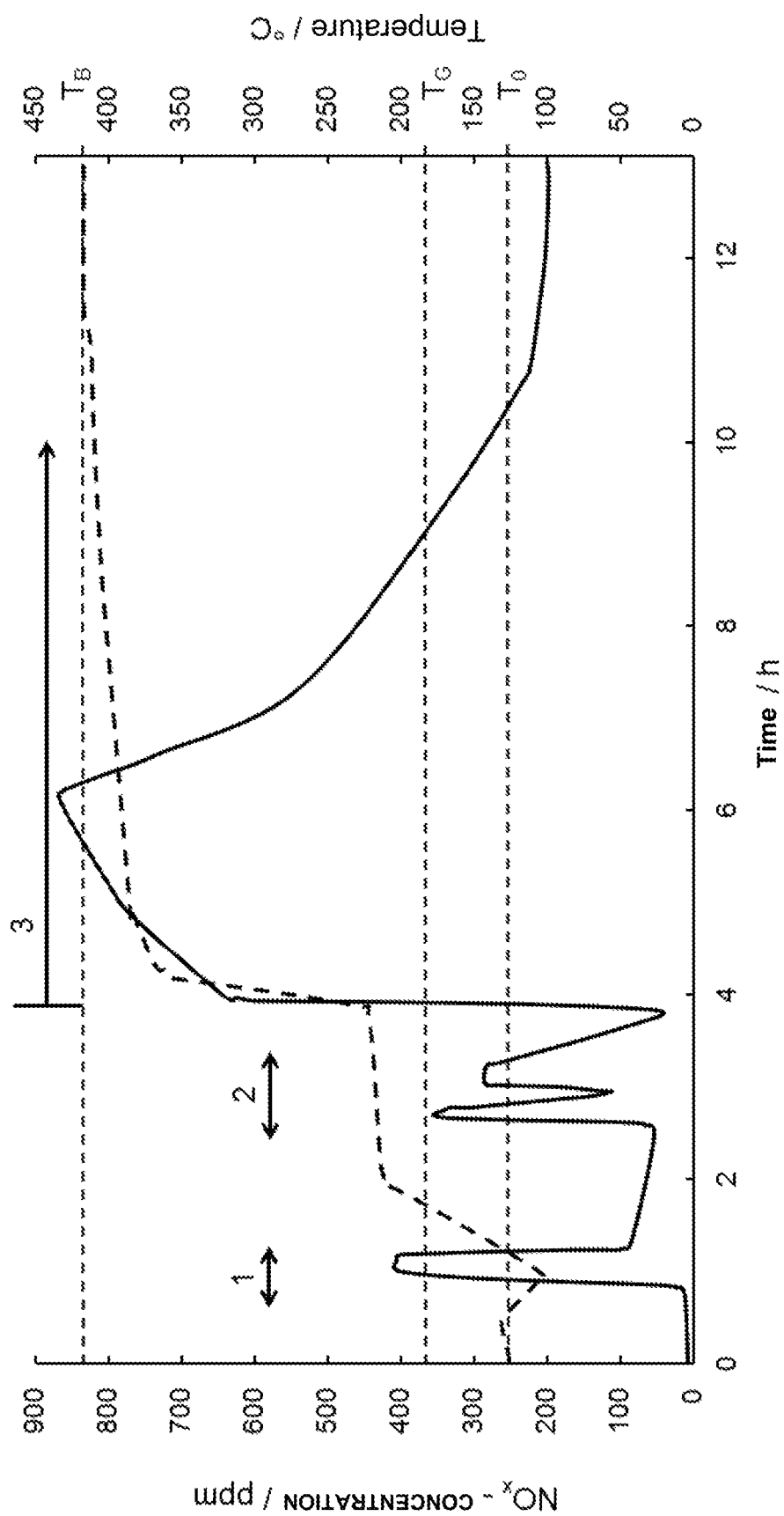
FIG. 1 is a graph depicting a profile of NOx concentration against time during startup of a conventional $HNO_3$ plant in a tail gas of a conventional nitric acid plant prior to entry thereof into any gas cleaning system.
Figure 2:
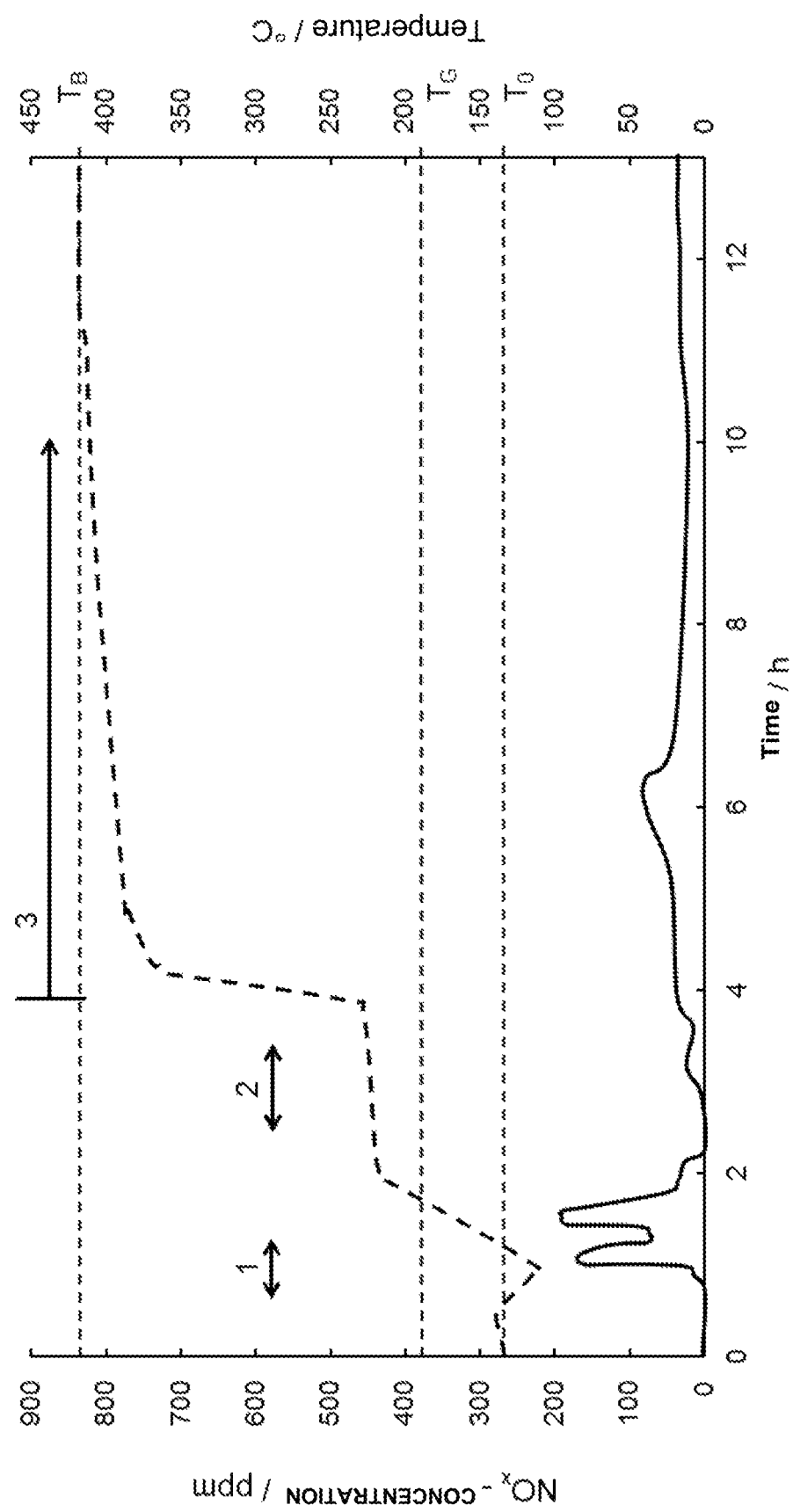
FIG. 2 is a graph depicting a profile of NOx offgas concentration beyond an installed conventional one-stage gas cleaning system based on a $V_2O_5/TiO_2$ catalyst.
Figure 3:
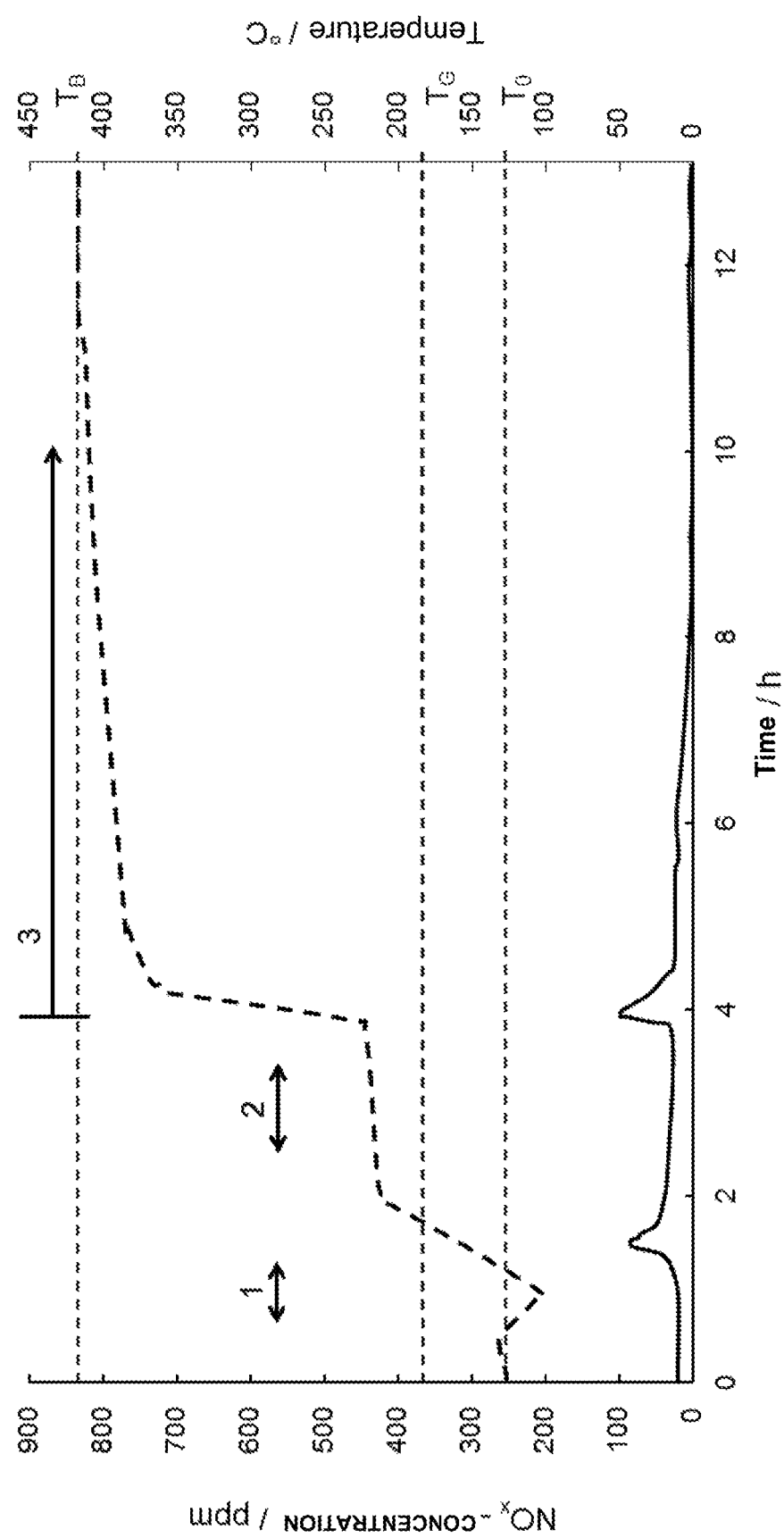
FIG. 3 is a graph depicting a profile of NOx concentration against time for a nitric acid plant equipped with an EnviNOx® system as a two-stage gas cleaning system on startup.
Figure 4:
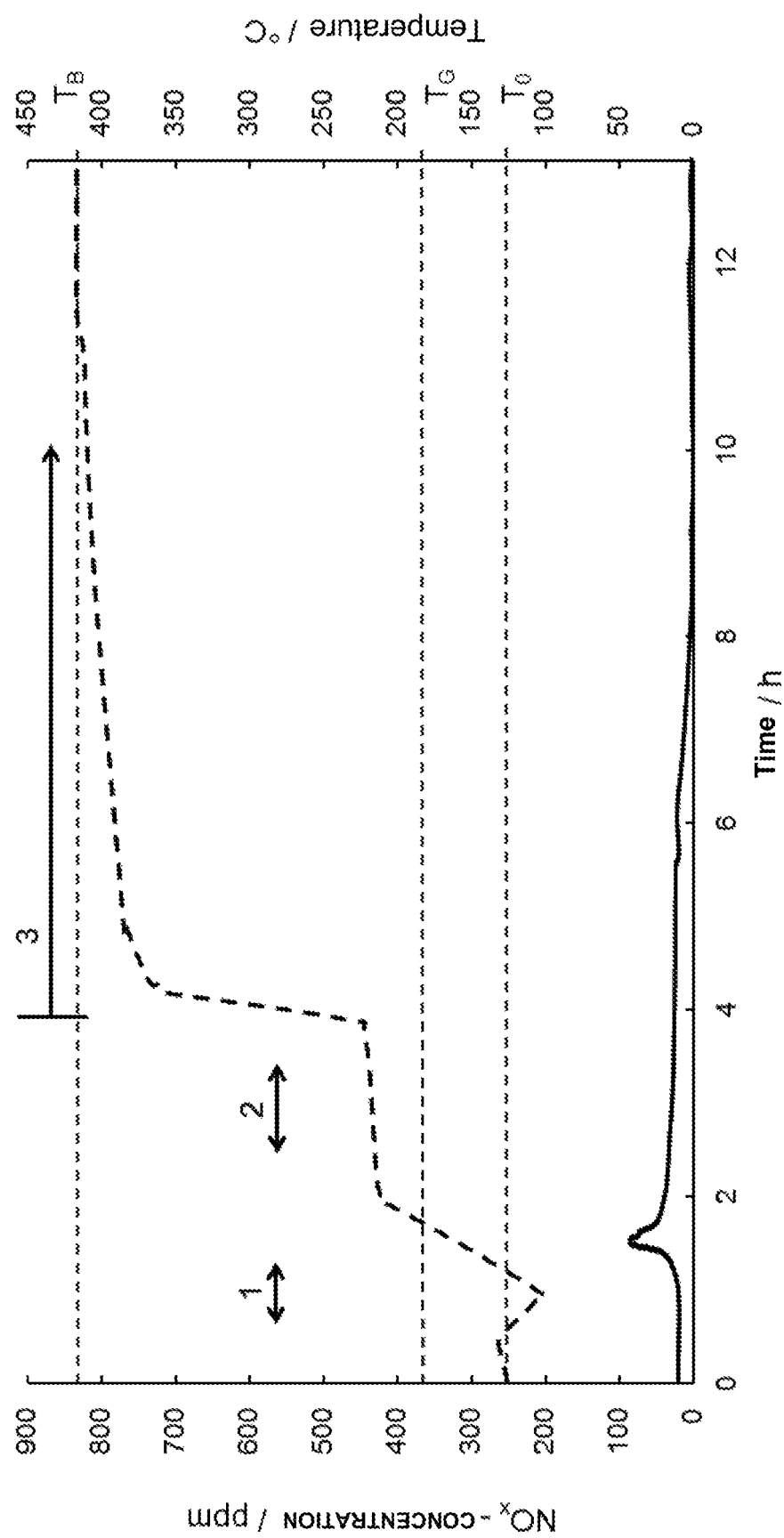
FIG. 4 is a graph depicting another profile of NOx concentration against time for a nitric acid plant equipped with an EnviNOx® system as a two-stage gas cleaning system on startup.

FIGS. 1 to 4 illustrate the invention in schematic form and by way of example on the basis of experimental data which are obtained in nitric acid plants of different configuration with different method regimes. FIGS. 1 and 2 illustrate conventional methods; FIGS. 3 and 4 illustrate the method of the invention.

FIG. 1 shows a typical profile of the $NO_x$ concentration against time in the startup of the $HNO_3$ plant in the tail gas of a nitric acid plant prior to entry thereof into any gas cleaning system, which thus shows the potential emission profile of the $HNO_3$ plant without any gas cleaning system in the startup of the plant (solid line). Likewise shown is the temperature as a function of operating time (dotted line). The tail gas temperature at time zero corresponds to the temperature that has been established after a plant shutdown ($T_0$). This depends on the ambient temperature and the shutdown time of the $HNO_3$ plant and, in the comparative example according to FIG. 1, is about 125° C. In phase 1, the machine set of the air compressor is started and the plant is filled with air (pressurized). There is emission here of $NO_x$ which was still present in the plant, i.e. in corresponding pipelines and gas spaces of the apparatuses, according to peak 1. In parallel, there is a constant rise in temperature because of the compression work and the energy introduced from the steam system to an intermediate level depending on the particular plant. The temperature $T_G$ is exceeded here, which in the comparative example according to FIG. 1 is about 185° C. Over and above this temperature, it would be possible to put a downstream gas cleaning system in operation, in principle without formation and accumulation of $NH_4NO_3$. In phase 2, the absorption tower of the plant is filled with unbleached acid (containing dissolved $NO_x$). Because of the lower pressure compared to standard operation, $NO_x$ is stripped (scrubbed) out of the acid and emitted to the environment. In phase 3, the actual production of acid is then commenced. For this purpose, $NH_3$ is switched on and oxidized with the atmospheric oxygen over platinum mesh catalysts to NO. Because of the heat of reaction released, which is introduced via heat exchangers into the tail gas after it leaves the absorption tower, there is a constant rise in temperature here up to the ultimate operating temperature $T_B$, which depends on the design of the plant. In the comparative example according to FIG. 1, $T_B$ is about 415° C. There is at first a drastic rise in the $NO_x$ emissions, since effectiveness of the absorption tower has not yet been attained. With increasing operating time, the effectiveness of the absorption tower increases and, as a result, there is a reduction in the $NO_x$ content in the offgas.

FIG. 2 shows, in schematic form, a typical profile of the $NO_x$ offgas concentration beyond an installed conventional one-stage gas cleaning system based on a $V_2O_5/TiO_2$ catalyst. The first peak (phase 1) has been shifted slightly to later times compared to FIG. 1, but there is no storage of $NO_x$ in the sense of the invention. From the threshold temperature $T_G$, the gas cleaning system is then charged with reducing agent ($NH_3$) and adjusted to an $NO_x$ concentration at the exit of the gas cleaning system of about 30 ppm by the variation of the amount of $NH_3$ at the inlet. In this way, the emission from phase 2 can already be virtually completely eliminated. In phase 3, however, because of the abrupt rise in the $NO_x$ inlet concentration, there may be a time-limited rise in $NO_x$ emission. In the comparative example according to FIG. 2, $T_0$ is about 135° C., $T_G$ is about 190° C. and $T_B$ is about 415° C.

FIG. 3 shows a nitric acid plant equipped with an EnviNOx® system as two-stage gas cleaning system on startup. By contrast with FIGS. 1 and 2, the emission of $NO_x$ in phase 1 by the selected SCR catalyst (iron-laden zeolite) is reduced by physical adsorption (storage). With the crossing of the temperature threshold $T_G$, in accordance with the invention, reducing agent ($NH_3$) is applied to the system. As a result, the total emission of $NO_x$ is distinctly reduced compared to FIGS. 1 and 2. In this inventive example, the reducing agent for the reduction of the $NO_x$, however, is applied to the reactor in a 1:1 $NH_3:NO_x$ stoichiometry with respect to the continuous new additional $NO_x$. Since, however, a greater amount of $NO_x$ has already collected at the catalyst beforehand, which is now desorbed in phase 3, the amount of reducing agent supplied is not entirely sufficient to reduce the total amount of $NO_x$. Consequently, the result is another smaller $NO_x$ peak, i.e. an $NO_x$ emission because of thermally induced desorption in phase 3. In the inventive example according to FIG. 3, $T_0$ is about 125° C., $T_G$ is about 185° C. and $T_B$ is about 415° C.

FIG. 4 likewise shows a nitric acid plant equipped with an EnviNOx® system as two-stage gas cleaning system on startup, conducting the method of the invention in a preferred embodiment. The emission of $NO_x$ in phase 1 is again reduced because of physical adsorption (storage) at the SCR catalyst (iron-laden zeolite). Because of the improved $NH_3$ dosage taking account of the total amount of $NO_x$ (already adsorbed at the catalyst+continuous new additional), a sufficient amount of reducing agent is now being metered in that, in parallel to the new additional $NO_x$, a majority of the $NO_x$ adsorbed on the catalyst is additionally also degraded before the temperature is increased in phase 3. In this way, it is even possible to virtually completely prevent the desorption of $NO_x$ shown in FIG. 3.

In the method of the invention, the tail gas contains $NO_x$ and is obtained during the startup of the plant for preparation of nitric acid. It is not absolutely necessary here that the $NO_x$-containing tail gas is obtained continuously during the startup of the plant. For instance, it is likewise possible in accordance with the invention that, during the startup of the plant, the incidence of the $NO_x$-containing residual gas is interrupted, possibly on more than one occasion, i.e., for example, occurs in intervals. In the inventive example according to FIG. 4, $T_0$ is about 125° C., $T_G$ is about 185° C. and $T_B$ is about 415° C.

A person skilled in the art will be able to distinguish the state of a plant for preparation of nitric acid during the startup thereof from the state of the plant during the steady-state operation thereof. Preferably, the tail gas during the startup of the plant has not yet attained its ultimate operating temperature $T_B$. Correspondingly, the tail gas during the subsequent steady-state operation of the plant has attained its operating temperature $T_B$, which then does not change any further thereafter beyond typical fluctuations. The startup of the plant precedes the steady-state operation of the plant, which directly follows the startup.

At the commencement of the startup of the plant, the tail gas obtained has the starting temperature $T_0$. If the plant has completely cooled down beforehand after the last phase of operation, the starting temperature $T_0$ corresponds to the ambient temperature. However, it is also possible in accordance with the invention that the starting temperature $T_0$ is above the ambient temperature, for instance when the duration of the temporary shutdown of the plant after the last phase of operation has not been sufficient for complete cooling of all devices and apparatuses. Preferably, the starting temperature $T_0$ is in the range from ambient temperature to 170° C., more preferably from ambient temperature to 150° C., even more preferably from ambient temperature to 120° C. and especially preferably from ambient temperature to 100° C.

In the course of the method of the invention, the $NO_x$-containing tail gas is heated from the starting temperature $T_0$, passing through a threshold temperature $T_G$ and finally up to the operating temperature $T_B$. Accordingly, $T_0 < T_G < T_B$. The heating of the $NO_x$-containing tail gas is preferably effected essentially constantly, but may also include minor, temporary phases of relative cooling. Preferably, the heating is effected exclusively by means of measures which are taken to recover the reaction energy obtained in ammonia oxidation in the standard process of nitric acid preparation, meaning that there is preferably no additional, active heating of the tail gas by suitable measures which as such would otherwise not be integrated into the process for preparing nitric acid.

In step (a) of the method of the invention, the $NO_x$-containing tail gas is passed through a storage medium for $NO_x$ and at least a portion of the $NO_x$ is stored in a storage medium for $NO_x$ while the temperature of the tail gas is less than the threshold temperature $T_G$. It is not necessary here for $NO_x$ to be fed into the storage medium and/or stored therein continuously over the entire period during which the temperature of the tail gas is less than the threshold temperature $T_G$. For instance, it is sufficient when the storage is effected during one or more intervals while the temperature of the tail gas is less than the threshold temperature $T_G$, and when the storage is effected for a period over which the temperature of the tail gas is less than the threshold temperature $T_G$.

The duration of storage of the $NO_x$ need not be over the entire period over which the temperature of the tail gas rises from the starting temperature $T_0$ until it is only slightly below the threshold temperature $T_G$. Thus, it is sufficient in principle in accordance with the invention if there is storage of at least a portion of the $NO_x$ present in the tail gas in the storage medium over a particular period of time for which the temperature of the tail gas is less than the threshold temperature $T_G$. Preferably, at least a portion of the $NO_x$ is stored in the storage medium at least until the temperature of the tail gas is only slightly below the threshold temperature $T_G$, for example 5° C. below $T_G$.

It will be apparent to the person skilled in the art that a storage process can proceed dynamically, meaning that $NO_x$ molecules that have been stored at an early stage in the storage medium at which the temperature of the tail gas is less than the threshold temperature $T_G$ can be released again at a later stage at which the temperature of the tail gas is likewise smaller than the threshold temperature $T_G$ and possibly replaced by new $NO_x$ molecules.

In addition, it is possible in principle that at least a portion of the $NO_x$ is additionally also stored when the temperature of the tail gas has already attained or exceeded the threshold temperature $T_G$.

Useful storage media for $NO_x$ include various apparatuses and materials.

Preferably, the $NO_x$ is stored by physical adsorption (physisorption) at the surface of solids and/or by chemical adsorption or absorption (chemisorption), i.e. by chemical reaction of the $NO_x$ with the storage material. Preferably, the storage medium for $NO_x$ comprises solids composed of inorganic materials.

Suitable materials for physical adsorption are especially adsorbents having high internal and/or external specific surface area that are known to those skilled in the art, such as various kinds of activated carbons, ashes, porous glasses, aluminas or silicatic materials, such as silica gel, clay minerals, e.g. montmorillonite, hydrotalcites or bentonites, or especially also natural or synthetic zeolites.

Suitable materials for chemical adsorption or absorption are those which enter into a superficial chemical reaction, or one which penetrates the entire solid materials, with $NO_x$ and/or preferably with $NO_2$. Such materials are known to those skilled in the art, for example, from the sector of gas treatment of automotive diesel exhaust gases. In this context, the term LNT (Lean $NO_x$ Trap) or NAC ($NO_x$ Absorber Catalyst) is used to refer to a wide variety of different materials for storage and/or reduction of ad- or absorbed $NO_x$ species. Examples include alkali metal and alkaline earth metal oxides, for example $Na_2O$, $K_2O$ or MgO, CaO, SrO, BaO, CaO, which form corresponding nitrates with $NO_2$ at various temperatures according to the metal, from which the $NO_x$ can then be released again by further thermal stress or else by addition of specific reducing agents in the optional step (b) of the method of the invention. Particular preference is given in the context of the invention to storage materials containing BaO, which can absorb $NO_2$ and reversibly release it again according to the following reaction scheme: $BaO + NO_2 \rightleftharpoons BaNO_3$.

The storage materials may comprise further components, for example noble metal dopants, for example platinum, which catalyze the oxidation of $NO_x$ to $NO_2$, so that they can then react to exhaustion to give the corresponding nitrates. Also possible is doping with SCR-active transition metals or transition metal oxides, for example Rh or $MnO_2$, as likewise known from the sector of gas treatment of automotive diesel exhaust gases. In this case, the chemisorbed $NO_x$ can also be released from the storage material in accordance with the invention by means of specific reducing agents such as ammonia or preferably hydrocarbons (HC) or HC mixtures. The nitrate species are preferably reduced here to nitrogen and water and optionally $CO_2$, as shown in the following reaction scheme:

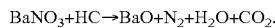

$$BaNO_3 + HC \rightarrow BaO + N_2 + H_2O + CO_2.$$

As well as a selection of material as such, the storage capacity of both the chemical and the physical storage materials can be varied and adjusted via the selection of the specific and geometric surface area of the solid materials.

Especially in the case of physical adsorption, the $NO_x$ is typically better stored at a lower temperature of the tail gas below the threshold temperature $T_G$ than at a higher temperature of the tail gas below the threshold temperature $T_G$, since there is an increase in desorption processes with rising temperature. In the case of chemical adsorption or absorption, a certain minimum temperature is generally required to overcome the corresponding chemical activation energies for the chemical reaction of the $NO_x$ with the storage material to proceed.

It is considered to be a particular advantage of the invention that the storage medium for $NO_x$ can be disposed in spatial terms in the tail gas line of a nitric acid plant at a position where the temperature level resulting from the production process is particularly favorable for the reversible storage of the $NO_x$. This is not necessarily the same site or the same temperature level at which the gas cleaning system is also operated. Preferably, the storage medium for $NO_x$ is arranged at a site such that its temperature, at any time during the startup, is below the particular temperature of the SCR catalyst at the same time. Preferably, the relative temperature differential is at least 5° C., more preferably at least 10° C.

In a particularly preferred embodiment, the SCR catalyst which catalyzes the reduction of $NO_x$ with the reducing agent for $NO_x$ in step (c) of the method of the invention in turn serves as storage medium in step (a) of the method of the invention. This is preferably achieved in accordance with the invention by virtue of the SCR catalyst comprising or consisting of a material which is preferentially suitable for adsorption of $NO_x$. Suitable SCR catalysts, especially suitable catalytic materials for reduction of $NO_x$ with a reducing agent for $NO_x$, especially with $NH_3$, are known to a person skilled in the art. These are preferably zeolites doped with transition metals, including the lanthanides, preferably zeolites doped with cobalt, especially with copper and most preferably with iron. Further possible transition metals which preferably occur in the zeolite together with cobalt, copper and/or iron are manganese, vanadium, chromium or nickel. The zeolites are preferably "high-silica" zeolites having high hydrothermal stability. Preferably, the zeolites are selected from the group of the MFI, BEA, FER, MOR and MEL types or mixtures thereof, and are preferably of the BEA or MFI type, more preferably a ZSM-5 zeolite.

In this embodiment of the invention, it is optionally possible to dispense with the release or transfer of the $NO_x$ in step (b) of the method of the invention, since the $NO_x$ is already adsorbed in the direct spatial proximity of or directly on the catalytically active material, such that the catalytic reduction can be initiated by supply of the reducing agent for $NO_x$ in step (c) without requiring separate release and transfer of the stored $NO_x$ beforehand.

Useful storage media for $NO_x$, as an alternative to solid materials, are in principle also vessels in which the $NO_x$-containing tail gas is accommodated temporarily, optionally under pressure.

Preferably, the temperature of the stored $NO_x$ varies during its storage. Preferably, the temperature of the stored $NO_x$ varies in accordance with the change in the temperature of the tail gas obtained in the startup of the plant.

Preferably, the storage medium for $NO_x$ is present in such an amount and with such a storage capacity that at least 20%, more preferably at least 30%, even more preferably at least 50%, most preferably at least 60%, and especially at least 70% of the total amount of the $NO_x$ obtained overall during the pressurization of the plant can be simultaneously stored temporarily, preferably by physical adsorption or by chemical adsorption or absorption. The total amount of the $NO_x$ obtained overall during the pressurization of the plant can be determined by a person skilled in the art by simple routine tests or else simple calculations.

The terms "pressurization", "filling" and "ignition" are known to a person skilled in the art in connection with plants for preparation of nitric acid and preferably have the meaning elucidated in the introductory part.

Preferably, in step (a) of the method of the invention, the method goes through a state during which the temperature of the tail gas is less than the threshold temperature $T_G$ and at least a portion of the total molar amount, preferably at least 20%, more preferably at least 30%, even more preferably at least 50% and especially at least 70% of the total molar amount of the $NO_x$ obtained in total during the pressurization in the plant is stored. Preferably, the method goes through this state shortly before the temperature of the tail gas reaches the threshold temperature $T_G$, for example 1 minute before.

In the optional step (b) of the method of the invention the $NO_x$ stored in step (a) is released. In addition, step (b) of the method of the invention optionally includes the transfer of the $NO_x$ released to an SCR catalyst, at the surface of which the $NO_x$ can be adsorbed and then catalytically reduced in step (c) with supply of reducing agent for $NO_x$.

The stored $NO_x$ can be released by means of an active measure or else passively.

In a preferred embodiment, the stored $NO_x$ is released passively, especially by means of the further heating of the tail gas to the threshold temperature $T_G$ and beyond. This embodiment is preferred especially when the storage of the $NO_x$ in the storage medium is based on physical adsorption or chemical adsorption or absorption. In this case, the $NO_x$ is preferably released by desorption, which is promoted with rising temperature of the $NO_x$ adsorbed or absorbed onto the storage medium. Preferably, in the method of the invention, the storage medium with the $NO_x$ adsorbed or absorbed thereon is exposed continuously to the $NO_x$-containing tail gas, such that, with heating of the $NO_x$-containing tail gas, it is heated thereby.

Preferably, the $NO_x$ stored in the storage medium is released when the temperature of the tail gas has attained the threshold temperature $T_G$. In the case of physical adsorption, it will be apparent to a person skilled in the art that, on the basis of the adsorption isotherm, the release in practice is not abrupt; instead, as a result of the preferably constant heating of the $NO_x$-containing tail gas and hence also as a result of the constant heating of the $NO_x$ stored in the storage medium, significant desorption processes are initiated from a particular temperature, which lead to release of the $NO_x$.

In another preferred embodiment, the stored $NO_x$ is released actively, especially when the storage medium used is a vessel in which the $NO_x$-containing tail gas is stored temporarily, optionally under pressure. In this case, the release can be effected, for example, by active opening of suitable valves and the $NO_x$ can be released from the storage medium.

Active additional temporary heating of the storage medium or of the tail gas stream entering the storage medium, which is typically not envisaged in the process scheme of a nitric acid plant, is also usable in the context of the invention. This heating is preferably operated in addition to the promotion of the customary heating of the tail gas, in order to assure faster attainment of $T_G$. The heating can be brought about, for example, by means of appropriate heat exchangers, burners or else electrical heating registers.

If the $NO_x$ is already stored in the direct spatial proximity or directly in the catalytically active material, especially adsorbed thereon, it is optionally possible to dispense with the release of the $NO_x$ in step (b) of the method of the invention, since the catalytic reduction can be initiated by supply of the reducing agent for $NO_x$ in step (c) of the method of the invention without requiring separate release and transfer of the stored $NO_x$ beforehand.

In step (c) of the method of the invention, the $NO_x$ is combined with a reducing agent for $NO_x$ in the presence of an SCR catalyst is once the temperature of the tail gas has exceeded the threshold temperature $T_G$, but not before, which results in catalytic reduction of at least a portion of the $NO_x$, preferably to $N_2$ and $H_2O$. For this purpose, the SCR catalyst is supplied with a reducing agent for $NO_x$ after, preferably as soon as the temperature of the tail gas has exceeded the threshold temperature $T_G$, but not before, which results in catalytic reduction of at least a portion of the $NO_x$, preferably to $N_2$ and $H_2O$.

Suitable reducing agents for $NO_x$ are known to a person skilled in the art. These may be any nitrogen-containing reducing agent having a high activity for reduction of $NO_x$. Examples are azanes, hydroxyl derivatives of azanes, and amines, oximes, carbamates, urea or urea derivatives. Examples of azanes are hydrazine and very particularly ammonia. One example of a hydroxyl derivative of azanes is hydroxylamine.

Examples of amines are primary aliphatic amines, such as methylamine. One example of carbamates is ammonium carbamate. Examples of urea derivatives are N,N'-substituted ureas, such as N,N'-dimethylurea. Ureas and urea derivatives are preferably used in the form of aqueous solutions. Particular preference is given to using ammonia as reducing agent for $NO_x$.

Suitable SCR catalysts, especially suitable catalytic materials for reduction of $NO_x$ with a reducing agent for $NO_x$, especially with $NH_3$, are known to a person skilled in the art. These are preferably zeolites doped with transition metals, including the lanthanides, preferably zeolites doped with cobalt, especially with copper and most preferably with iron. Further possible transition metals which preferably occur in a zeolite together with cobalt, copper and/or iron are manganese, vanadium, chromium or nickel.

The zeolites are preferably high-silica zeolites having high hydrothermal stability. The zeolites are preferably selected from the group of the MFI, BEA, FER, MOR and MEL types or mixtures thereof, and are preferably of the BEA or MFI type, more preferably a ZSM-5 zeolite.

Exact details of the makeup or structure of the zeolite types used in accordance with the present disclosure are given in the Atlas of Zeolite Structure Types, Elsevier, 4th revised edition 1996, which is hereby incorporated by reference in its entirety.

In addition, preference is given to using "steamed" zeolites, i.e. zeolites where, following a hydrothermal treatment, some of the aluminum lattice atoms have moved to interstitial lattice sites. The person skilled in the art is aware of such zeolites and the mode of preparation thereof.

The content of transition metals in the zeolites may, based on the mass of zeolite, vary within wide ranges, preferably up to 25%, but preferably 0.1% to 10%, and especially 2% to 7%.

The zeolites can be doped with the transition metals, for example, proceeding from the H or preferably $NH_4$ form of the zeolites by ion exchange (in aqueous phase or by solid-state reaction) with appropriate salts of the transition metals. The SCR catalyst powders obtained are typically calcined in a chamber furnace under air at temperatures in the range from 400 to 650° C. After the calcination, the transition metal-containing zeolites are washed vigorously in distilled water, and the zeolite is filtered off and then dried. These and other relevant methods of loading or doping of zeolites with transition metals are known to the person skilled in the art. Finally, the transition metal-containing zeolites thus obtained can be admixed and mixed with suitable auxiliaries for plasticization and binders, for example aluminosilicates or boehmite, and, for example, extruded to give cylindrical SCR catalyst bodies.

The SCR catalyst may take the form of shaped bodies of any size and geometry, preferably geometries which have a high ratio of surface to volume and generate a minimum pressure drop on flow-through. Typical geometries are all those known in catalysis, for example cylinders, hollow cylinders, multihole cylinders, rings, crushed pellets, trilobes or honeycomb structures. The size of the SCR catalyst particles or shaped catalyst bodies used may vary within wide ranges. Typically, these have an equivalent diameter in the range from 1 to 10 mm. Preference is given to equivalent diameters of 2 to 5 mm. The equivalent diameter is the diameter of a sphere of equal volume.

According to the invention, $NO_x$ and reducing agent for $NO_x$ are only combined in the presence of the SCR catalyst once the temperature of the $NO_x$-containing tail gas has attained the threshold temperature $T_G$, but not before. If the combination were already to take place beforehand, the unwanted formation and accumulation of $NH_4NO_3$ could not be effectively prevented, since the temperature of the tail gas is not yet high enough. According to the invention, step (c) of the method of the invention can be commenced as soon as the temperature of the tail gas has attained the threshold temperature. However, it is also possible that step (c) of the method of the invention is commenced only a while after the temperature of the tail gas has exceeded the threshold temperature, for example only once the temperature of the tail gas is 5° C. or 10° C. above the threshold temperature $T_G$.

According to the invention, step (c) of the method of the invention, however, is preferably commenced before the temperature of the tail gas has attained the operating temperature $T_B$. Preferably, the performance of step (c) of the method of the invention has already commenced before the $NH_3$ burner of the plant for preparation of nitric acid is started (ignited).

According to the invention, the threshold temperature $T_G$ is preferably therefore that temperature of the $NO_x$-containing tail gas at which, under the given conditions in the particular plant for preparation of nitric acid, there is just no formation and accumulation of $NH_4NO_3$ when the $NO_x$ is combined with the reducing agent for $NO_x$ in the presence of the SCR catalyst. This threshold temperature $T_G$ is known to the person skilled in the art from the literature (for example Iwaki et al, Appl. Catal. A, 390 (2010) 71-77 or Koebel et al, Ind. Eng. Chem. Res. 40 (2001) 52-59) or can be determined by corresponding simple routine tests. Preferably, the threshold temperature $T_G$ is in the range from 170° C. to 200° C. and is therefore preferably 170° C., 171° C., 172° C., 173° C., 174° C., 175° C., 176° C., 177° C., 178° C., 179° C., 180° C., 181° C., 182° C., 183° C., 184° C., 185° C., 186° C., 187° C., 188° C., 189° C., 190° C., 191° C., 192° C., 193° C., 194° C., 195° C., 196° C., 197° C., 198° C., 199° C. or 200° C. According to the SCR catalyst used, the threshold temperature $T_G$ may, however, also be lower or higher.

Step (c) of the method of the invention is preferably additionally also conducted at much higher temperatures above the threshold temperature $T_G$, preferably over the entire temperature range from the threshold temperature $T_G$ up to the operating temperature $T_B$ of the tail gas, but not at temperatures of the tail gas below the threshold temperature $T_G$. Since the operating temperature $T_B$ is typically at temperatures of the tail gas of at least 300° C., more preferably at least 350° C. and especially preferably at least 400° C., step (c) of the method of the invention is preferably also effected at temperatures of the tail gas distinctly exceeding the threshold temperature $T_G$.

The supply of a reducing agent for $NO_x$ to the SCR catalyst in step (c) can be effected by customary measures known to a person skilled in the art. In a preferred embodiment, the $NO_x$ is already in the presence of the SCR catalyst beforehand and is more preferably already adsorbed thereon. This embodiment is preferred especially when the SCR catalyst in step (c) of the method of the invention has already acted beforehand in step (a) of the method of the invention as storage medium for $NO_x$. It has been found that, surprisingly, the stored (adsorbed) $NO_x$ or $NO_2$ is rapidly removed again from the SCR catalyst by the supply of a particular amount of reducing agent. This is also true when this SCR storage catalyst is supplied with further $NO_x$ in parallel.

Preferably, the metered addition of the reducing agent for $NO_x$, preferably the ammonia, is regulated or adjusted/controlled such that maximum reduction of the sorbed $NO_x$ and of any which is still yet to arrive at the storage medium or the SCR catalyst is brought about, without occurrence of an unwanted breakthrough (slip) of ammonia. The amounts of reducing agent required for the purpose are dependent on the nature of the reducing agent and the type and nature of the SCR catalyst and other operating parameters such as pressure and temperature. Especially when the storage medium used and/or the SCR catalyst used is capable of storing not only $NO_x$ but additionally also $NH_3$, which is the case for the transition metal-laden zeolite catalysts that are particularly preferred in accordance with the invention, it should be ensured in accordance with the invention that, in step (c), the amount of reducing agent ($NH_3$) metered in is not more than required for the reduction of the $NO_x$. Otherwise, there is the risk of unintended slip of $NH_3$ during the heating phase.

In the case of ammonia as reducing agent for $NO_x$, it is customary to add such an amount of $NH_3$ as to result in, based on the $NH_3$ and $NO_x$ components sorbed on the storage medium or still to arrive there, a molar $NH_3/NO_x$ ratio of 0.8 to 2.5, preferably of 0.9 to 2.0, more preferably of 1.0 to 1.8.

Contrary to the regulation of the amount of $NH_3$ applied with respect to the desired $NO_x$ exit concentration which is typically employed in gas cleaning systems, in the simplest case, it is preferred in accordance with the invention to employ ratio control with regard to the $NO_x$ inlet concentration. In the case of this control method, the $NO_x$ concentration is determined upstream of the gas cleaning system (i.e. at the inlet) and $NH_3$ is metered in according to the aforementioned molar $NH_3:NO_x$ ratio. It is thus possible to ensure that a coreactant for the $NH_3$ applied is constantly available and that unwanted accumulation of $NH_3$ on the SCR catalyst is effectively prevented.

Accordingly, step (c) of the method of the invention preferably comprises the measurement of the concentration of $NO_x$ in the tail gas before the tail gas is contacted with the SCR catalyst, with metered addition (control) of the amount of reducing agent for $NO_x$ supplied as a function of the measured concentration of $NO_x$, such that accumulation of the reducing agent on the SCR catalyst is prevented. Preference is accordingly given to supplying no more reducing agent for $NO_x$ than is consumed by the catalytic reduction of $NO_x$.

Preferably, the reducing agent for $NO_x$, preferably $NH_3$, is fed to the tail gas line directly upstream of the SCR catalyst and guided onto the surface of the SCR catalyst where the $NO_x$ is adsorbed, such that the $NO_x$ can be catalytically reduced there, preferably to $N_2$ with simultaneous formation of $H_2O$.

Preferably, the reduction is effected at least partly by the "fast" SCR process, i.e. according to the reaction scheme:

$$2NH_3 + NO + NO_2 \rightarrow 2N_2 + 3H_2O$$

or the "normal" SCR process, i.e. according to the reaction scheme:

$$4NH_3 + 4NO + O_2 \rightarrow 4N_2 + 6H_2O.$$

The oxidation level of the $NO_x$ entering the SCR catalyst is preferably 30% to 70%, more preferably 40% to 60%, especially preferably about 50%.

If the oxidation level of the $NO_x$ is too high, i.e. when the proportion of $NO_2$ in the mixture with NO is too great, in a preferred embodiment of the method of the invention, the oxidation level of the $NO_x$ is reduced and in this way adjusted to a desired lower value. Preferably, the oxidation level is adjusted such that it does not exceed 80%, more preferably 75%, even more preferably 70% and especially 65%. Suitable measures for reducing the content of $NO_2$ are known to a person skilled in the art. The the equilibrium between $NO_2$ and NO is temperature-dependent, it is possible, for example by varying the temperature, in the presence of suitable catalysts (e.g. platinum), to shift the thermodynamic equilibrium in the desired direction.

Since $NO_2$ can generally be better stored than NO, a comparatively high oxidation level for the storage in step (a) of the method of the invention is advantageous. In step (c) of the method of the invention, by contrast, a high oxidation level can have an adverse effect, for which reason it is preferable in accordance with the invention to reduce the oxidation level over the course of the method from high values (e.g. >70%) for step (a) to moderate values (e.g. 70%) for step (c).

In a preferred embodiment of the method of the invention, the relationship of $T_0$, $T_G$ and $T_B$ with respect to one another is as follows: $T_0<170°$ C. and/or $170°$ C.$\leq T_G<300°$ C. and/or $300°$ C.$\leq T_B$.

Preferred embodiments $A^1$ to $A^B$ for ranges of the starting temperature $T_0$, the threshold temperature $T_G$ and the operating temperature $T_B$ with $T_0<T_G<T_B$ are summarized in the following table:

| [° C.] | $A^1$ | $A^2$ | $A^3$ | $A^4$ | $A^5$ | $A^6$ | $A^7$ | $A^8$ |
|---|---|---|---|---|---|---|---|---|
| $T_0$ | <170 | ≤150 | ≤120 | ≤120 | ≤100 | ≤100 | ≤100 | ≤100 |
| $T_G$ | 170-220 | 170-220 | 170-210 | 170-210 | 170-200 | 180-200 | 180-200 | 180-190 |
| $T_B$ | ≥300 | ≥310 | ≥320 | ≥330 | ≥340 | ≥350 | ≥375 | ≥400 |

Preferably, steps (a) and (c) of the method of the invention proceed one after the other, but it is possible that the optional step (b) is effected partly or completely simultaneously with step (c).

Preferably, the method of the invention is operated and the amount of reducing agent required is metered in such that at least 50%, more preferably at least 60%, even more preferably at least 70%, most preferably at least 80%, and especially at least 90% of the total amount of $NO_x$ obtained during the startup of the plant for preparation of nitric acid, i.e. during the pressurization and filling, is reduced.

In a preferred embodiment, the nitric acid plant whose startup causes the $NO_x$ to be obtained comprises a gas cleaning system for reducing the concentrations of $NO_x$ and $N_2O$ in the tail gas which is formed after the startup of the plant during the steady-state operation of the nitric acid plant. The gas cleaning system accordingly especially (also) pursues the purpose of reducing the concentration of nitrogen oxides (NO, $NO_2$ and $N_2O$) in the tail gas in the steady-state operation of the plant.

In a particularly preferred embodiment, steps (a), optionally (b) and (c) of the method of the invention are effected within this gas cleaning system. For this purpose, preferably, the SCR catalyst in whose presence the reduction of the $NO_x$ is effected in step (c) of the method of the invention is disposed in the gas cleaning system. In this case, the gas cleaning system accordingly pursues two purposes, namely of reducing the concentration of the nitrogen oxides obtained in the tail gas both in the startup and in the steady-state operation of the plant.

A further aspect of the invention relates to a method of reducing the nitrogen oxide concentrations (preferably $NO_x$ and $N_2O$) in the tail gas which are obtained both during the startup of a plant for preparation of nitric acid and thereafter during the steady-state operation of the plant. This method of the invention comprises the above-described method of reducing the concentration of nitrogen oxides in the tail gas which are obtained during the startup of a plant for preparation of nitric acid.

All preferred embodiments which have been described above in connection with the method of the invention for reducing the concentration of nitrogen oxide in tail gas obtained during the startup of a plant for preparation of nitric acid also apply analogously to the method of the invention for reducing the concentration of nitrogen oxides (preferably $NO_x$ and $N_2O$) in tail gas obtained both during the startup of a plant for preparation of nitric acid and thereafter during the steady-state operation of the plant, and are therefore not repeated.

In a preferred embodiment, during the steady-state operation of the plant,
(i) $N_2O$ is decomposed catalytically to $O_2$ and $N_2$ and $NO_x$ is reduced catalytically in the presence of a reducing agent for $NO_x$; or
(ii) $N_2O$ is reduced catalytically in the presence of a reducing agent for $N_2O$ and $NO_x$ is reduced catalytically in the presence of a reducing agent for $NO_x$; or
(iii) $N_2O$ is broken down catalytically to $O_2$ and $N_2$ and then residual $N_2O$ is further reduced catalytically in the presence of a reducing agent for $N_2O$ and $NO_x$ is reduced catalytically in the presence of a reducing agent for $NO_x$.

Preferably, the two above-described embodiments (i), (ii) and (iii) are variants of what is called EnviNOx® technology, which is also referred to hereinafter and in the context of the invention as (i) EnviNOx® technology "variant 1", and (ii) EnviNOx® technology "variant 2" and (iii) EnviNOx® technology "variant ½", and the mode of operation of which or the plant design of which is described in EP 01 905 656.3-2113. EP 1 370 342 B1, EP 1 515 791 B1, EP 2 286 897 B1 (all variant 1), EP 1 497 014 (variant 2) and in DE 10 2005 022 650 A1 (variant ½).

More preferably, for this purpose, the plant has a gas cleaning system for reducing the concentration of $NO_x$ and $N_2O$ in tail gas obtained during the steady-state operation of the plant for preparation of nitric acid, wherein
(i) the gas cleaning system has a two-stage construction, wherein $N_2O$ is broken down catalytically to $O_2$ and $N_2$ in the first stage in flow direction of the tail gas during the steady-state operation of the plant, after the first stage a reducing agent for $NO_x$ is mixed with the tail gas and then, in a second stage, $NO_x$ is reduced catalytically in the presence of the reducing agent; or
(ii) during the steady-state operation of the plant, the tail gas is mixed in the gas cleaning system with a reducing agent for $NO_x$ and a hydrocarbon, carbon monoxide, hydrogen or a mixture of these gases as reducing agent for $N_2O$, wherein the reducing agent is added in such an amount which is sufficient at least for complete reduction of the $NO_x$, and that the gas mixture is passed through at least one reaction zone comprising an SCR catalyst for the reduction of $NO_x$ and for the reduction of $N_2O$; or
(iii) the gas cleaning system has a two-stage construction, wherein, during the steady-state operation of the plant, in flow direction of the offgas, in the first stage, $N_2O$ is broken down catalytically to $O_2$ and $N_2$, and the offgas, after the first stage, is mixed with a reducing agent for $NO_x$ and a hydrocarbon, carbon monoxide, hydrogen or a mixture of these gases as reducing agent for $N_2O$, wherein the reducing agent is added in such an amount which is sufficient at least for complete reduction of the $NO_x$, and that the gas mixture is passed through at least one reaction zone comprising a catalyst for the reduction of $NO_x$ and for the reduction of $N_2O$.

In the gas cleaning system, it is possible to use various already known cleaning methods arranged downstream of the absorption tower in flow direction of the tail gas discharged from the plant for preparation of nitric acid. These may be conventional SCR methods in which residues of $NO_x$ are removed catalytically and with use of reducing agents for $NO_x$, preferably of $NH_3$, from the tail gas of the plant for preparation of nitric acid. Typical SCR catalysts contain transition metal oxides, especially $V_2O_5$ supported on $TiO_2$, noble metals, especially platinum, or zeolites laden with transition metals, especially zeolites laden with iron. Such methods that are suitable for the steady-state operation of the plant for preparation of nitric acids are known per se (cf., for example, WO 01/51181 A1, WO 03/105998 A1, and WO 03/084646 A1 described). A general overview of SCR catalysts for $NO_x$ reduction can be found, for example, in the description in G. Ertl, H. Knözinger J. Weitkamp: Handbook of Heterogeneous Catalysis, vol. 4, pages 1633-1668, VCH Weinheim (1997)).

Preferably, the gas cleaning system is based on EnviNOx® technology, variant 1, variant 2, or variant ½. This is a method in which $NO_x$ and $N_2O$ are removed catalytically from the tail gas and wherein at least the $NO_x$ is reduced by supply of $NH_3$. In the EnviNOx® method, preference is given to using iron zeolite catalysts; these have particularly good suitability for the catalytic reduction, especially the complete catalytic reduction, of $NO_x$, surprisingly simultaneously have the required property as a storage medium, by contrast with conventional SCR catalysts based on $V_2O_5$/$TiO_2$, and offer the additional advantage that they can also be used at higher temperatures compared to the aforementioned conventional SCR catalysts, which opens up the option of simultaneous $N_2O$ reduction.

It has been found that, surprisingly, compared to conventional plants, there is a change in the $NO_x$ emission characteristics when the plant for preparation of nitric acid is equipped with a gas cleaning system based on EnviNOx® technology (variant 1, variant 2 or variant ½). There is a reduction here in $NO_x$ emission (first $NO_x$ peak during the pressurization of the nitric acid plant) to a maximum concentration of below 100 ppm and it seems to be slightly delayed. The second peak (filling of the absorption tower) is likewise delayed, but is approximately the same in terms of intensity. By contrast, the third peak (production of $HNO_3$) appears to be distinctly enhanced at the start. It has been found that, surprisingly, the iron-zeolite catalysts used with preference in the EnviNOx® method are capable of physically absorbing (storing) $NO_2$ primarily at temperatures below 250° C. If the $NO_2$ absorption capacity of the SCR catalyst has been attained after a while, the gas cleaning system merely brings about a slight delay in the $NO_x$ emission characteristics.

Through the preferred combination of properties of both at first acting as storage medium (absorption medium) for $NO_x$ and then as SCR catalyst for the reduction of $NO_x$, the zeolite catalysts that are particularly preferred in accordance with the invention enable a distinct reduction in $NO_x$ emissions during the startup of the plant for preparation of nitric acid. The minimum temperature (~200° C.) for performance of the reduction of $NO_x$ is often already attained after phase 1 and before phase 2 (cf. FIG. 1). It is thus possible, after the exceedance of this temperature ($T_G$), to feed reducing agents, especially $NH_3$, by metering into the reaction space and in this way to reduce the nitrogen oxides obtained in phase 2 and phase 3 of the startup. Overall, the use of such a gas cleaning system thus offers distinct advantages over systems based on conventional SCR catalysts which do not have storage properties. The ability of the SCR catalysts used (e.g. iron-zeolite catalysts) to store (adsorb) $NO_x$ at first reduces the emission directly after the starting of the plant.

This in principle also gives rise to the advantage that the gas cleaning system can be integrated into the plant for preparation of nitric acid at points where, in steady-state operation, there are temperatures ($T_B$) of 400 to 500° C. It is thus already possible in air operation of the plant for preparation of nitric acid to attain a temperature of more than 200° C., for example of 210-230° C., at the inlet of the gas cleaning system, which enables supply of reducing agent in step (c) even in air operation.

Because the gas cleaning system based on EnviNOx® technology (variant 1, variant 2 or variant ½) is designed not just for reduction of $NO_x$ but additionally also brings about the lowering of $N_2O$, the amount of SCR catalyst provided is increased compared to conventional systems, which has a favorable effect on the storage capacity of the SCR catalyst for $NO_x$. One advantage of this procedure is that additional $NO_2$ molecules and $NH_3$ molecules which have not reacted to exhaustion by the SCR reaction over the SCR catalyst are adsorbed in an unexpectedly large amount on the SCR catalyst and hence are not emitted into the environment. Because the concentration of $NO_x$ during the pressurization operation occurs only as a peak and hence is limited in terms of volume, the storage capacity of conventional gas cleaning systems based on EnviNOx® technology (variant 1, variant 2 or variant ½) is frequently already sufficient to effectively prevent emission. A further advantage can be achieved when the adsorbed $NO_2$ is removed again from the SCR catalyst through the addition of a predetermined amount of reducing agent which has preferably been determined beforehand.

A further aspect of the invention relates to an apparatus for reducing the concentration of nitrogen oxides in tail gas obtained during the startup of a plant for preparation of nitric acid, comprising the elements:
A) a storage medium for $NO_x$ having a capacity sufficient such that at least 5.0% by volume of the $NO_x$ obtained in total during the startup of the plant for preparation of nitric acid can be stored in the storage medium;
B) optionally means of releasing the stored $NO_x$;
C) an SCR catalyst for reduction of $NO_x$;
D) a control device comprising a temperature measurement device for determining the temperature of the tail gas and a metering device for metering in a reducing agent for $NO_x$ as a function of the measured temperature of the tail gas; and
E) means of combining the reducing agent for $NO_x$ with the $NO_x$ in the presence of the SCR catalyst for catalytic reduction of at least a portion of the $NO_x$.

Preferably, the apparatus of the invention serves to reduce the concentration of nitrogen oxides (preferably $NO_x$ and $N_2O$) in tail gas, which are obtained both during the startup of a plant for preparation of nitric acid and thereafter during the steady-state operation of the plant.

All preferred embodiments that have been described above in connection with the two methods of the invention also apply analogously to the apparatus of the invention, and are therefore not repeated.

In a preferred embodiment, the apparatus of the invention comprises, as additional elements,
F) means of adjusting the oxidation level of the $NO_x$, which are preferably suitable for adjusting the oxidation level of the $NO_x$ such that it does not exceed 80%, more preferably 75%, even more preferably 70% and especially 65%.

In a preferred embodiment of the apparatus of the invention, the SCR catalyst for reduction of $NO_x$ C) also acts as storage medium A). Suitable SCR catalysts, especially suitable catalytic materials for reduction of $NO_x$ with a reducing agent for $NO_x$, especially $NH_3$, are known to a person skilled in the art. Preferably, the catalytically active material is selected from the group consisting of iron, compounds of iron, cobalt, compounds of cobalt, copper and compounds of copper. Iron-zeolite catalysts are particularly preferred. Preferably, the SCR catalyst for $NO_x$ is present in such an amount and with such a storage capacity that, in its effect as a storage medium for $NO_x$, it can temporarily and simultaneously store at least 20%, more preferably at least 30%, even more preferably at least 50%, and especially at least 70%, of the total molar amount of $NO_x$ obtained overall during the pressurization of the plant, preferably by physisorption and/or chemisorption.

Preferably, storage medium for $NO_x$ and SCR catalyst for reduction of $NO_x$ are one and the same element and/or are arranged in a gas cleaning system into which the tail gas coming from the absorption tower of the plant for preparation of nitric acid is introduced.

Most preferably, the gas cleaning system comprises an iron-laden zeolite as SCR catalyst and the gas cleaning system is positioned downstream of the absorption tower in the tail gas line of the plant for preparation of nitric acid at such a point where the tail gas in steady-state operation has a temperature ($T_B$) of at least 300° C., preferably at least 350° C., especially at least 400° C.

A further aspect of the invention relates to the use of the above-described apparatus of the invention in one of the two above-described methods of the invention.

All preferred embodiments which have been described above in connection with the two methods of the invention and the apparatus of the invention also apply analogously to the use of the invention and are therefore not repeated.

What is claimed is:

1. A method, comprising:
   generating nitrogen oxides ($NO_x$) in a nitric acid production plant;
   directing the NOx into an absorption tower of the nitric acid production plant and removing tail gas comprising unabsorbed $NO_x$ from the absorption tower; and
   reducing the concentration of $NO_x$ in the tail gas obtained during startup of the nitric acid production plant,
   wherein the tail gas is heated from a starting temperature, through a threshold temperature, and to an operating temperature at which steady-state operation of the nitric acid production plant for preparation of nitric acid can be effected,
   passing the tail gas through a storage medium for $NO_x$ and storing at least a portion of the $NO_x$ in the storage medium while the temperature of the tail gas is below the threshold temperature, wherein a selective catalytic reduction (SCR) catalyst serves as the storage medium;
   combining, when the temperature of the tail gas exceeds the threshold temperature, the $NO_x$ in the storage medium with a reducing agent for $NO_x$ in the presence of the SCR catalyst, which results in catalytic reduction of at least a portion of the $NO_x$ in the storage medium;
   measuring, when the temperature is below the operating temperature, a concentration of the $NO_x$ in the tail gas before the tail gas contacts the SCR catalyst; and
   metering, based on said measuring of the concentration of the $NO_x$, an amount of the reducing agent sufficient to degrade the $NO_x$ already adsorbed on the SCR catalyst and the measured concentration of the $NO_x$.

2. The method of claim 1 wherein at least one of
   the starting temperature is less than 120° C.,
   the threshold temperature is greater than or equal to 120° C. and less than 300° C., or
   the operating temperature is greater than or equal to 300° C.

3. The method of claim 1 wherein the SCR catalyst comprises a catalytically active material selected from a group consisting of iron, compounds of iron, cobalt, compounds of cobalt, copper, and compounds of copper.

4. The method of claim 1 wherein the SCR catalyst comprises aluminum silicate.

5. The method of claim 4 wherein the aluminum silicate comprises a zeolite.

6. The method of claim 1 further comprising adjusting a level of oxidation of the $NO_x$ in the tail gas.

7. The method of claim 1 wherein the reducing agent for NOx comprises ammonia.

8. The method of claim 1 further comprising reducing a concentration of the $NO_x$ and $N_2O$ in tail gas obtained after the startup of the nitric acid production plant during the steady-state operation of the nitric acid production plant by way of a gas cleaning system of the nitric acid production plant for preparation of nitric acid.

9. The method of claim 8 wherein the SCR catalyst is disposed in the gas cleaning system.

10. The method of claim 1 comprising the steady-state operation of the nitric acid production plant, the steady-state operation comprising:
    breaking down $N_2O$ catalytically to $O_2$ and $N_2$ and reducing $NO_x$ catalytically in the presence of the reducing agent for $NO_x$; or
    reducing $N_2O$ catalytically in the presence of a reducing agent for $N_2O$ and reducing $NO_x$ catalytically in the presence of the reducing agent for $NO_x$; or
    breaking down $N_2O$ catalytically to $O_2$ and $N_2$, further reducing residual $N_2O$ catalytically in the presence of the reducing agent for $N_2O$, and reducing $NO_x$ catalytically in the presence of the reducing agent for $NO_x$.

11. The method of claim 10 wherein the nitric acid production plant includes a gas cleaning system for reducing the concentration of the $NO_x$ and $N_2O$ in the tail gas obtained during the steady-state operation, wherein
    the gas cleaning system includes a two-stage construction, wherein the $N_2O$ is broken down catalytically to $O_2$ and $N_2$ in a first stage in a flow direction of the tail gas during the steady-state operation of the nitric acid production plant, after the first stage the reducing agent for NOx is mixed with the tail gas and then, in a second stage, the NOx is reduced catalytically in the presence of the reducing agent; or
    during the steady-state operation of the nitric acid production plant the tail gas is mixed in the gas cleaning system with the reducing agent for the NOx and a hydrocarbon, carbon monoxide, hydrogen, or a mixture thereof as the reducing agent for the $N_2O$, wherein the reducing agent is added in such an amount that is sufficient at least for complete reduction of the NOx, and that a gas mixture is passed through at least one reaction zone comprising the SCR catalyst for reduction of the NOx and for reduction of the $N_2O$; or
    the gas cleaning system includes a two-stage construction, wherein during the steady-state operation of the nitric acid production plant in a flow direction of an offgas, in a first stage, the $N_2O$ is broken down catalytically to $O_2$ and $N_2$, and the offgas, after the first stage, is mixed with a reducing agent for the NOx and a hydrocarbon, carbon monoxide, hydrogen, or a mixture thereof as a reducing agent for the $N_2O$, wherein the reducing agent is added in such an amount that is sufficient at least for complete reduction of the NOx, and that a gas mixture is passed through at least one reaction zone comprising a catalyst for reduction of the NOx and for reduction of the $N_2O$.

* * * * *